(No Model.)
P. F. WELLS.
BEAN HARVESTER.
No. 500,089. Patented June 20, 1893.
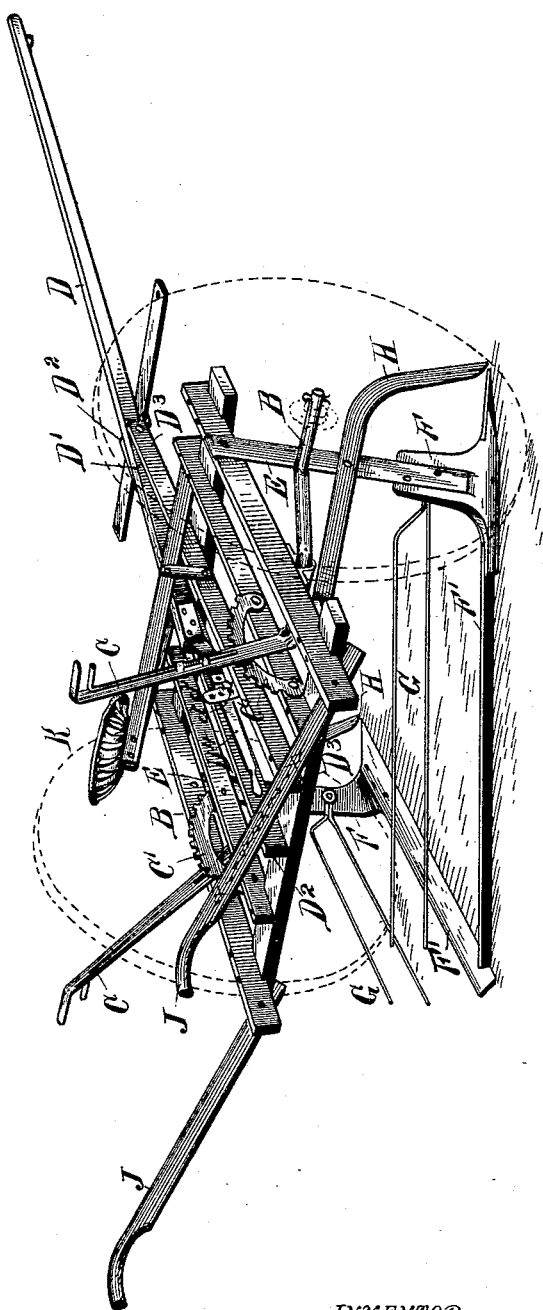
WITNESSES
J.W. Bradford
F. Clough
INVENTOR
Philip F. Wells
by Parker & Burton,
Attorneys.

UNITED STATES PATENT OFFICE.

PHILIP F. WELLS, OF MILFORD, MICHIGAN.

BEAN-HARVESTER.

SPECIFICATION forming part of Letters Patent No. 500,089, dated June 20, 1893.

Application filed April 18, 1892. Serial No. 429,660. (No model.)

*To all whom it may concern:*

Be it known that I, PHILIP F. WELLS, a citizen of the United States, residing at Milford, county of Oakland, State of Michigan, have invented a certain new and useful Improvement in Bean-Harvesters; and I declare the following to be a full, clear, and exact description of the invention, such as will enable others skilled in the art to which it pertains to make and use the same, reference being had to the accompanying drawing, which forms a part of this specification.

My invention relates to bean harvesters, and consists in certain improvements in the combination and arrangement of special parts hereinafter pointed out.

The drawing, represents the harvester, which is mounted upon two rotatable cranked axles B, B, the cranks of which form axles for the wheels, which appear in dotted lines therein; thus the axles for each wheel are independent and independently rotatable. Rigidly attached to each axle are the levers C, C, carrying latches which engage in notched sectors C', C'. The sectors being rigidly attached to the frame to which the axle is pivoted, it follows that the axle may be maintained rigidly in any position permitted by the sector, so that the elevation of each side of the frame from the ground can be increased or diminished by the operator at will. As this apparatus, however, is not new and is common to many forms of agricultural implements, it needs no further description.

D is the pole, which is horizontally pivoted to the apex of a triangle formed at D' by two interior pieces of the frame, D², D³, permitting thereby the outer end to be vertically raised or lowered upon such pivot. From the point of this pivot the pole extends rearwardly, and attached thereto is a lever or handle D⁴. Projecting from the side of this handle is a lug $d$, which is adapted to be engaged in a perpendicular sector $d'$, containing holes, and which is rigidly attached to a portion of the frame. By means of this lever and the perforated sector and the successive engagement of the lug in the holes therein, the angle of the pole D with reference to the frame may be adjusted by the operator, and when so adjusted is rigidly held in position.

Firmly attached to the outer side pieces of the frame are standards E, E. The lower ends of these standards carry securely attached thereto share holders F, F, and shares F', F'. The share holders are concaved on their inner sides to permit of the setting of the shares at an angle; thus, these shares are pointed in front and project rearwardly and inwardly, forming two sides of a triangle and approaching very closely at the apex, as shown in the drawing.

Securely attached to the shareholders and above the shares upon either side, are a pair of gathering rods, G, G.

Attached to the standards and also to the outside of the frame, which is rectangular, and forming a brace between them, are the share guards H, H. This construction is important in combination with the long shares and single standards which I employ, as the guards are attached to the frame; thus, the perpendicular planes of the guards and the perpendicular planes of the shares are at an angle to each other. Thus, the brace resists the twisting strain brought upon the lower end of the standard due to the propulsion of the machine forward when the shares are engaged in cutting the vines, causing a resistance to the inner ends of the shares.

Heretofore, it has been the practice to either use two standards with long shares, or to use a single standard with short shares. This form of construction permits me to use a single standard with a long share, as I obtain sufficient strength by means of the arrangement of the brace. This brace is prolonged forward of the standard, and bent downwardly and brought in contact with the point of the share, whereby it serves as a guard. These guards prevent the vines from accumulating or wedging in over the shares, and also serve as braces to the standards E carrying the shares.

To the rear of the machine are attached suitable handles, J, J, by which it may be guided by an operator on foot. Also attached to the machine by means of suitable framing is a seat K, and from which seat all of the levers that have been named can readily be reached and operated by the operator.

The operation of this device is as follows: In its ordinary and proper working, the shares F', F', are intended to operate just under the surface of the ground throughout their whole length, and are designed to embrace two rows of bean vines as they are ordinarily planted. The shares pull or cut the roots out from the ground, and the vines are gathered by the gathering rods, G, G, into a continuous windrow which is left as the machine progresses. In order to permit the shares, which as seen are relatively of considerable length, to remain substantially parallel to the surface of the ground as the sides respectively of the machine are properly adjusted as to height by means of the crank axles, the pole is jointed as hereinbefore specified, and the angle of the pole relative to the frame of the machine can be adjusted by means of the lever $D^4$ and the perforated sector $d'$. This feature is also peculiarly valuable in its operation upon uneven ground and side hills as if, when horses are traveling up-hill, the outer end of the pole can be elevated relative to the line of the shares so as to still permit them to operate properly with reference to the surface; whereas, when it is descending, the angle of the pole can be varied for the same purpose, while on side hills the sides can be adjusted independently, and the pole also be adjusted to the best advantage.

The guards H, H, forming the braces make the structure very cheap, simple and strong, and at the same time permit ready removals for repairs in case of breakage or necessary replacement of the wearing parts.

Having thus described my invention, what I claim, and desire to secure by Letters Patent, is—

In a bean harvester, the combination of a rectangular frame, a share situated in a perpendicular plane at an angle with the perpendicular plane of the outer sides of said frame, a combined brace and guard extending from the point of the share upwardly, thence rearwardly and upwardly, and attached rigidly to the standard carrying the share and the outer sides of the frame in such manner that the perpendicular planes of the guard and of the share form an acute angle, the apex being coincident with the point of the share, substantially as and for the purpose described.

In testimony whereof I sign this specification in the presence of two witnesses.

PHILIP F. WELLS.

Witnesses:
WALTER CRAWFORD,
W. A. CRAWFORD.